United States Patent
Allen et al.

(10) Patent No.: US 10,229,354 B2
(45) Date of Patent: Mar. 12, 2019

(54) APPARATUS AND METHOD COMPRISING AN ANTENNA FOR RADIO COMMUNICATION AND ENERGY STORAGE DEVICE

(71) Applicant: Nokia Technologies Oy, Espoo (FI)

(72) Inventors: Mark Allen, Great Cambourne (GB); Di Wei, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/503,213

(22) PCT Filed: Aug. 13, 2015

(86) PCT No.: PCT/FI2015/050524
§ 371 (c)(1),
(2) Date: Feb. 10, 2017

(87) PCT Pub. No.: WO2016/024045
PCT Pub. Date: Feb. 18, 2016

(65) Prior Publication Data
US 2017/0236050 A1  Aug. 17, 2017

(30) Foreign Application Priority Data

Aug. 13, 2014 (WO) .................. PCT/FI2014/050618

(51) Int. Cl.
*G06K 7/08* (2006.01)
*G06K 19/077* (2006.01)
(Continued)

(52) U.S. Cl.
CPC ... *G06K 19/07773* (2013.01); *G06K 19/0702* (2013.01); *H01M 6/40* (2013.01);
(Continued)

(58) Field of Classification Search
CPC ...... G06K 7/0008; G06F 3/1454; G06F 3/147
(Continued)

(56) References Cited

U.S. PATENT DOCUMENTS 5,731,105 A    3/1998  Fleischer et al.
9,754,727 B2 * 9/2017  Wee ...................... H01G 9/038
(Continued)

FOREIGN PATENT DOCUMENTS

DE   19624887 A1   1/1997
EP   0 350 235 A2  1/1990
(Continued)

OTHER PUBLICATIONS

International Search Report and Written Opinion received for corresponding Patent Cooperation Treaty Application No. PCT/FI2015/050524 dated Dec. 4, 2015, 23 pages.
(Continued)

*Primary Examiner* — Ahshik Kim
(74) *Attorney, Agent, or Firm* — Harrington & Smith (57) ABSTRACT

An apparatus comprising: one or more cells, each cell comprising: a proton conductor (25) configured to conduct proton charge carriers; an electron conductor region (26) configured to conduct electrons; a first electrode (27) associated with one of the proton conductor region (26) and the electron conductor region (26); and a second electrode (28) associated with the other of the proton conductor region (25) and the electron conduction region (26); an antenna (50), wherein at least a portion of the antenna (50) is configured to provide at least some of the first electrode(s) (27) of the one or more cells; and circuitry (80) configured to be powered via second electrode(s) (28) of the one or more cells in electrical parallel, wherein the circuitry (80) is configured to operably connect to the antenna (50). An apparatus comprising: an antenna (50) comprising an
(Continued)

antenna element (52) and a ground plane (54); and an energy storage device (20); wherein the ground plane (54) provides an electrode of the energy storage device (20).

20 Claims, 8 Drawing Sheets

(51) Int. Cl.
*H01M 6/40* (2006.01)
*H01Q 1/38* (2006.01)
*G06K 19/07* (2006.01)
*H01Q 1/22* (2006.01)
*H01Q 1/24* (2006.01)
*H01M 10/36* (2010.01)

(52) U.S. Cl.
CPC .......... *H01M 10/36* (2013.01); *H01Q 1/2225* (2013.01); *H01Q 1/248* (2013.01); *H01Q 1/38* (2013.01)

(58) Field of Classification Search
USPC ....................................................... 235/451
See application file for complete search history.

(56) References Cited

U.S. PATENT DOCUMENTS

| | | |
|---|---|---|
| 2004/0217865 A1 | 11/2004 | Turner |
| 2004/0246099 A1 | 12/2004 | Tuttle |
| 2008/0030422 A1* | 2/2008 | Gevargiz ............. H01Q 1/2216 343/860 |
| 2008/0316121 A1* | 12/2008 | Hobson .................. H01Q 1/243 343/702 |
| 2009/0038746 A1 | 2/2009 | Tucholski |
| 2009/0193649 A1 | 8/2009 | Niessen et al. |
| 2010/0060456 A1 | 3/2010 | Forster ........................ 340/572.1 |
| 2010/0068995 A1 | 3/2010 | Brantner |
| 2012/0170171 A1 | 7/2012 | Lee et al. ........................ 361/502 |
| 2013/0175513 A1* | 7/2013 | Ford .................... H01L 51/0591 257/40 |
| 2013/0314094 A1 | 11/2013 | Farmer et al. |
| 2013/0342419 A1 | 12/2013 | Takigahira et al. |
| 2014/0315084 A1 | 10/2014 | Liu et al. |

FOREIGN PATENT DOCUMENTS

| | | |
|---|---|---|
| WO | 2010030743 A1 | 3/2010 |
| WO | 20140188059 A1 | 11/2014 |

OTHER PUBLICATIONS

Gao, Han et al., "Proton-conducting polymer electrolytes and their applications in solid supercapacitors: a review", RSC Advamces: An International Journal to Further the Chemical Sciences, vol. 4, No. 62, Jul. 2014, pp. 33091-33113.

* cited by examiner

APPARATUS AND METHOD COMPRISING AN ANTENNA FOR RADIO COMMUNICATION AND ENERGY STORAGE DEVICE

RELATED APPLICATION

This application was originally filed as Patent Cooperation Treaty Application No. PCT/FI2015/050524 filed Aug. 13, 2015 which claims priority benefit to PCT Application PCT/FI2014/050618, filed Aug. 13, 2014.

TECHNOLOGICAL FIELD

Embodiments of the present invention relate to an apparatus and a method. In particular, they relate to an apparatus comprising an antenna for radio communication and an energy storage device.

BACKGROUND

An apparatus with an antenna may be able to receive energy, via received electromagnetic waves transmitted from a transmitter. However, an apparatus that has an additional or alternative energy storage device may operate more flexibly.

It may be desirable for an apparatus to comprise its own energy storage device so that it can operate when it is not receiving energy from another source.

It may be desirable that such energy storage devices do not occupy large volumes.

BRIEF SUMMARY

According to various, but not necessarily all, embodiments of the invention there is provided an apparatus comprising:
one or more cells, each cell comprising:
  a proton conductor region;
  a electron conductor region;
  a first electrode associated with one of the proton conductor region and the electron conductor region; and
  a second electrode associated with the other of the proton conductor region and the electron conductor region;
an antenna, wherein at least a portion of the antenna is configured to provide at least some of the first electrode(s) of the one or more cells; and
circuitry configured to be powered via second electrode(s) of the one or more cells in electrical parallel, wherein the circuitry is configured to operably connect to the antenna.

According to various, but not necessarily all, embodiments of the invention there is provided a method comprising:
forming on a substrate an antenna, wherein at least a portion of the antenna is configured to provide, in electrical parallel, at least some first electrode(s) of one or more cells;
forming on the substrate second electrode(s) of the one or more cells, in electrical parallel;
providing on the substrate circuitry configured to be powered via the second electrode(s) of the one or more cells, wherein the circuitry is operably connected to the antenna; and
forming the one or more cells, by:
  forming one or more proton conductor regions, associated with the first electrode(s), and configured to conduct proton charge carriers;
  forming one or more electron conductor regions, associated with the second electrode(s), and configured to conduct electrons.

According to various, but not necessarily all, embodiments of the invention there is provided an apparatus comprising: an antenna comprising an antenna element and a ground plane; and an energy storage device;
wherein the ground plane provides an electrode of the energy storage device.

According to various, but not necessarily all, embodiments of the invention there is provided a method comprising: simultaneously forming at least a part of an antenna comprising an antenna element and a ground plane; and at least a part of an energy storage device, such that the ground plane of the antenna is formed as an electrode of the energy storage device.

According to various, but not necessarily all, embodiments of the invention there may be provided an apparatus comprising
one or more proton battery cell, each cell comprising:
  a proton-generator region configured to donate proton charge carriers;
  a proton-acceptor region configured to accept donated proton charge carriers;
  a first electrode associated with one of the proton-generator region and the proton-acceptor region; and
  a second electrode associated with the other of the proton-generator region and the proton-acceptor region;
an antenna, wherein at least a portion of the antenna is configured to provide, in electrical parallel, at least some of the first electrode(s) of the one or more proton battery cell; and
circuitry configured to be powered via the second electrode(s) of the one or more proton battery cell, wherein the circuitry is configured to operably connect to the antenna.

According to various, but not necessarily all, embodiments of the invention there may be provided a method comprising
forming on a substrate an antenna, wherein at least a portion of the antenna is configured to provide, in electrical parallel, at least first electrode(s) of one or more proton battery cell;
forming on the substrate second electrodes of the one or more proton battery cell, in electrical parallel;
providing circuitry configured to be powered via the second electrode(s) of the one or more proton battery cell, wherein the circuitry is configured to be operably connected to the antenna; and
forming the one or more proton battery cell, by:
  forming one or more proton-generator region, associated with the first electrode(s), and configured to donate proton charge carriers;
  forming one or more proton-acceptor region, associated with the second electrode(s), and configured to accept donated proton charge carriers.

BRIEF DESCRIPTION

For a better understanding of various examples that are useful for understanding the brief description, reference will now be made by way of example only to the accompanying drawings in which.

DETAILED DESCRIPTION

The Figures illustrate examples of an apparatus 10. The apparatus 10 may be a portable energy storage and antenna device.

Figure 1:
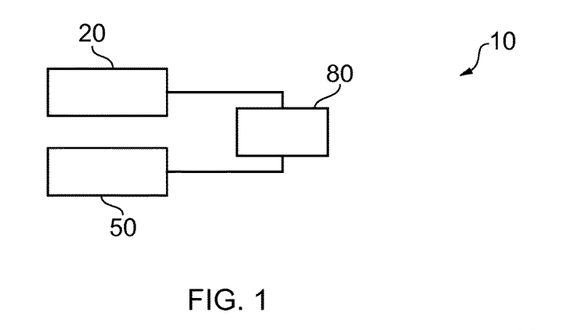
FIG. 1 illustrates examples of an apparatus comprising an energy storage device; an antenna; and circuitry configured to be powered via the energy storage device and the antenna.

The apparatus 10, for example as illustrated in FIG. 1, comprises an energy storage device 20; an antenna 50; and circuitry 80 configured to be powered via the energy storage device 20 and the antenna 50. The antenna 50 may provide an electrode of the energy storage device 20.

Figure 5:
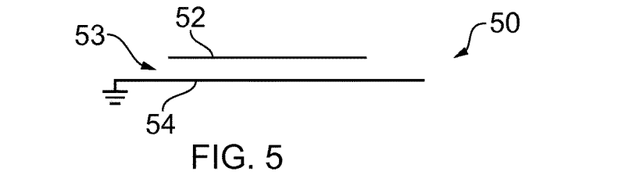
FIG. 5 illustrates an example in which the antenna comprises an antenna element and a ground plane.

In some but not necessarily all examples, the antenna 50 may comprise an antenna element 52 and a ground plane 54, for example as illustrated in FIG. 5. In some but not necessarily all examples, the ground plane 54 may provide an electrode of the energy storage device 20.

The energy storage device 20 may comprise one or more cells, for example proton battery cells, or comprise any other suitable energy storage device.

Figure 2:
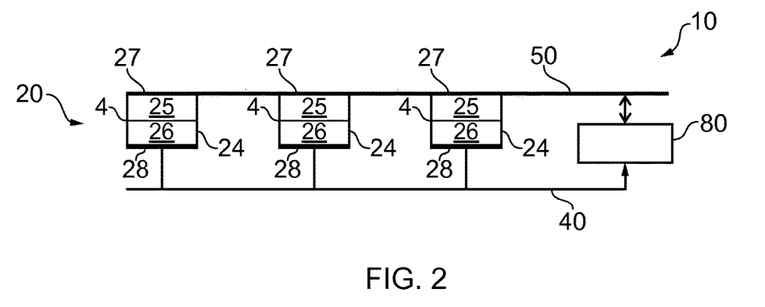
FIG. 2 illustrates an example of the apparatus comprising a plurality of proton battery cells as the energy storage device.

In some but not necessarily all examples, for example as illustrated in FIG. 2, where the energy storage device 20 comprises one or more proton battery cell 24, the antenna 50 is configured to provide, in electrical parallel, at least some of the electrodes of the one or more proton battery cell 24.

FIG. 2 illustrates an example of the apparatus 10 comprising the antenna 50, the circuitry 80, and one or more proton battery cell 24 as the energy storage device 20.

Each proton battery cell 24 comprises: a proton conductor region 25 configured to conduct proton charge carriers; a electron conductor region 26 configured to conduct electrons; a first electrode 27 associated with one of the proton conductor region 25 and the electron conductor region 26; and a second electrode 28 associated with the other of the proton conductor region 25 and the electron conductor region 26.

The portion of the antenna 50 that provides the first electrodes 27 may be a grounded portion such as a ground plane. In this case, the first electrodes are anodes and are associated with proton conductor regions 25 of the proton battery cells 24, as illustrated in the example of FIG. 2. However, other configurations are possible.

In this example, but not necessarily all examples, at least a portion of the antenna 50 is configured to provide, in electrical parallel, at least some of the first electrodes 27 of the one or more proton battery cell 24.

The circuitry 80 is configured to be powered via interconnect 40 which connects second electrodes 28 of the one or more proton battery cell 24 in electrical parallel.

The circuitry 80 is configured to operably connect to the antenna 50 for communication via the antenna 50.

In some but not necessarily all examples, the proton conductor region 25 may comprise a graphene derivative and/or comprise graphene oxide and/or comprise charge-generating functional groups comprising one or more of carboxyl, hydroxyl, and epoxy. Such a proton conductor region 25 may be configured to generate and conduct protons in the presence of water.

In some but not necessarily all examples, the electron conductor region 26 may comprise a graphene derivative different to that used in the proton conductor region 25 such as, for example, reduced graphene oxide and/or comprise conjugated polymer.

In some but not necessarily all examples, the proton conductor region 25 has an acidic pH and the electron conductor region 26 has an alkali pH. The pH difference from the proton conductor region 25 to the electron conductor region 26 may be greater than 8. For example, in some but not necessarily all examples, the pH of the proton conductor region 25 may be less than 4 and the pH of the electron conductor region 26 may be equal to or greater than 12 or 13.

In some but not necessarily all examples, the proton conductor region 25 is separated from the electron conductor region 26 by a semi-permeable membrane 4. The membrane 4 may be, for example, an ionomer membrane. One example of a synthetic ionomer is a sulfonated tetrafluoroethylene-based fluropolymer-copolymer e.g. NAFION.

The first electrodes 27 and second electrodes 28 operate as charge collectors and may be formed from metallic material such as, for example, silver or copper.

In some but not necessarily all examples, the proton conductor region 25 may be formed from printed ink and/or the electron conductor region 26 may be formed from printed ink.

Figure 3:
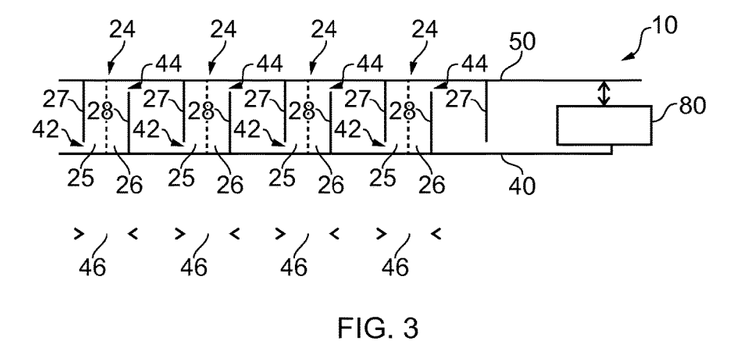
FIG. 3 illustrates an example of the apparatus comprising two-dimensional proton battery cells.

FIG. 3 illustrates an example of the apparatus 10, illustrated in FIG. 2.

In this example, the proton battery cell 24 or, if more than one proton battery cell, some or all of the proton battery cells 24 are two-dimensional, that is the first electrode 27 and the second electrode 28 forming a proton battery cell 24 lie in the same common two-dimensional plane.

The apparatus 10 may comprise a single proton battery cell 24 that has a single first electrode 27 and a single second electrode 28, where the first electrode 27 and the second electrode 28 are interdigitated. In this case, the junction 24 would follow the interdigitated gap between the first electrode 27 and the second electrode 28.

The illustrated apparatus 10, however, alternatively comprises a plurality of proton battery cells 24 each of which has a first electrode 27 and a second electrode 28, and the plurality of first electrodes 27 and the plurality of second electrodes 28 are interdigitated. The plurality of cells 24 are in parallel with shared first electrodes 27 and second electrodes 28.

The first electrode 27 and second electrode 28 of each proton battery cell 24 are straight, parallel and separated by a separation gap 46.

The first electrodes 27 extend from the antenna 50 towards interconnect 40 and are separated from the interconnect 40 by first gaps 42.

The second electrodes 28 extend from the interconnect 40 towards the antenna 50 and are separated from the antenna 50 by second gaps 44.

The circuitry 80 is connected to interconnect 40 and the antenna 50.

Figure 4:
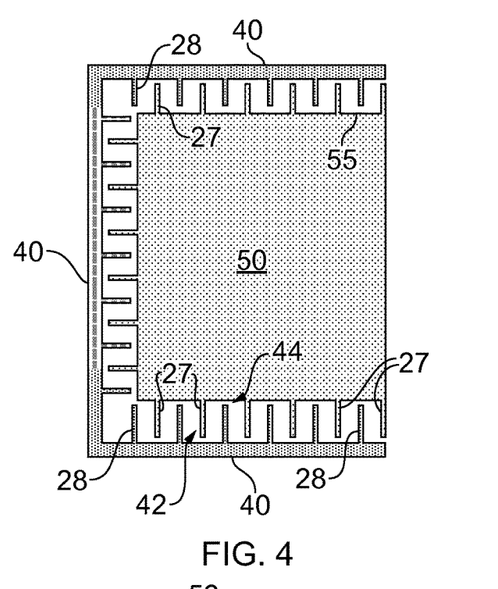
FIG. 4 illustrates an example of the apparatus in which first electrodes are distributed around an outer perimeter of the antenna and extend from the outer perimeter of the antenna towards a perimeter interconnect.

FIG. 4 illustrates an example similar to FIG. 3. In this example, the first electrodes 27 are distributed around an outer perimeter 55 of the antenna 50 and extend from the outer perimeter 55 of the antenna 50 towards a perimeter interconnect 40 that at least partially surrounds the outer perimeter 55 of the antenna 50.

The first electrodes 27 extend outwardly from the outer perimeter 55 of the antenna 50 towards the perimeter interconnect 40 and are separated from the perimeter interconnect 40 by first gaps 42. The second electrodes 28 extend inwardly from the perimeter interconnect 40 towards the outer perimeter 55 of the antenna 50 and are separated from the antenna 50 by second gaps 44.

FIG. 5 illustrates an example of an antenna 50. In this example, but not necessarily all examples, the antenna 50 comprises an antenna element 52 and a ground plane 54 separated by a gap 53.

The antenna element 52 is connected in electrical parallel with the ground plane 54. The circuitry 80 provides a feed to the antenna element 52 and is connected to the ground plane 54.

In some but not necessarily all examples, the antenna 50 may, for example, be configured as a patch antenna, a microstrip antenna, a planar inverted F antenna (PIFA), a planar inverted L antenna (PILA), an inverted F antenna (IFA), an inverted L antenna (ILA), a planar asymmetrically fed folded antenna (PAFFA), or any antenna where the antenna element 52 is disposed relative to the ground plane 54 in physical parallel, as non-limiting examples.

The ground plane 54 may provide one or more electrodes of the energy storage device 20. The electrode(s) provided by the ground plane 54 may be integrated within the energy storage device 20.

An advantage of using a microstrip antenna, as a non-limiting example, is that the design of the antenna element 52 is independent of the design of the ground plane 54 and the energy storage device 20 integrated with the ground plane 54.

Where one or more proton battery cell 24 are used for the energy storage device 20, the ground plane 54 may provide first electrodes 27 of at least some of the one or more proton battery cell 24 and the antenna element 52 may additionally provide second electrodes 28 of at least some of the one or more proton battery cell 24.

However, other energy storage devices 20 may be used. For example, the energy storage device 20 may be a low-profile battery and it may additionally or alternatively be flexible.

Figure 6A:
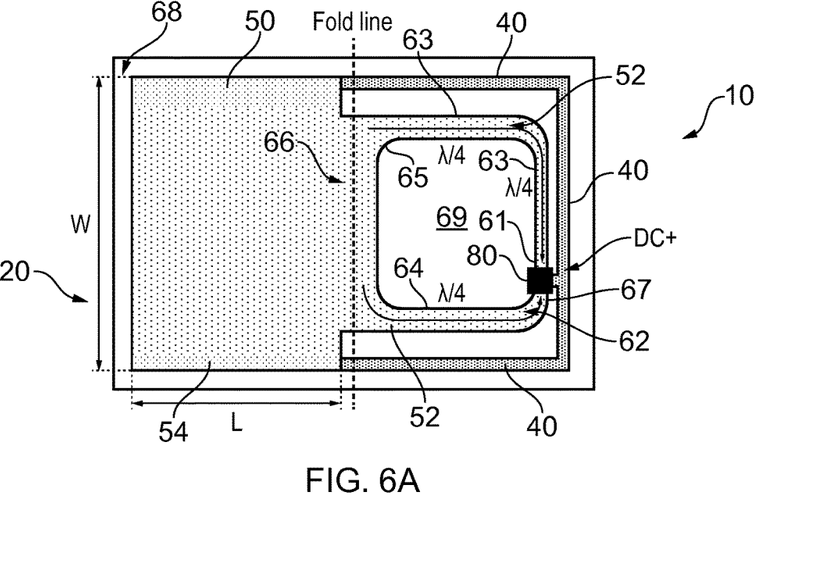
FIG. 6A illustrates an example of the apparatus comprising the antenna of FIG. 5

FIG. 6A illustrates an example of the apparatus 10 comprising the antenna 50 of FIG. 5.

In this example a flat substrate 68 supports the antenna element 52 and the ground plane 54.

Figure 6B:
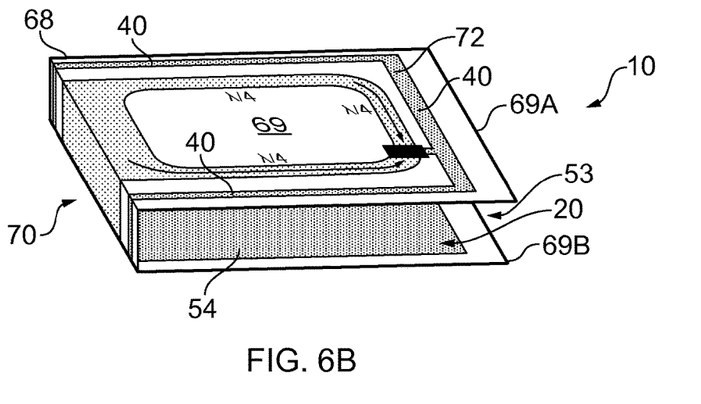
FIG. 6B illustrates the apparatus of FIG. 6A when folded.

The substrate 68 is configured to be folded such that the antenna element 52 and the ground plane 54 overlap in different parallel, physically separated planes, as illustrated in FIG. 6B. In other examples, the antenna element 52 may only partially overlap the ground plane 54.

In FIG. 6A, the antenna element 52 lies in a plane and comprises an in-plane feed terminal 61 and an in-plane ground terminal 62.

In this example, the antenna element 52 and the ground plane 54 are interconnected at a first extremity 65 of the antenna element 52 and an extremity 66 of the ground plane 54. The terminals 61, 62 are at a second extremity 67 of the antenna element 54 opposing the first extremity 65.

The antenna element 52 comprises a first antenna element 63 extending from the ground plane 54 to provide the feed terminal 61 and a second antenna element 64 extending from the ground plane 54 to provide the ground terminal 62.

The first antenna element 63 has a first electrical length L1. The second antenna element 64 has a second electrical length L2. The difference between the first electrical length L1 and the second electrical length L2 is a quarter wavelength $\lambda/4$ at an operational resonant frequency $f_R$ of the antenna 50.

In this particular example the first antenna element 63 has a first electrical length L1 of $2*\lambda/4$ and the second antenna element 64 has a second electrical length L2 of $\lambda/4$.

In this particular example, but not necessarily all examples, the first antenna element 63, the circuitry 80 and the second antenna element 64 form a loop that, with the extremity 66 of the ground plane 54, from which the first antenna element 63 and the second antenna element 64 extend, encloses a central region 69.

In this example, the loop is approximately square with each of the four orthogonal sides having an electrical length of $\lambda/4$. It will be appreciated that the electrical length of the perimeter of the loop is $\lambda$. In order, the square has a first side, a second side, a third side and a fourth side. The first antenna element 63 forms the first side and the second side of the square. The second antenna element 64 forms the third side of the square, which opposes the first side. The extremity 66 of the ground plane 54 forms the fourth side of the square, which opposes the second side.

The substrate 68 may be folded to form a folded substrate as illustrated in FIG. 6B. In FIG. 6B, the substrate 68 comprises a fold 70 interconnecting the antenna element 52 and the ground plane 54.

The antenna element 52 and the circuitry 80 lie in a first plane 69A. The ground plane 54 occupies at least a second plane 69B, which is parallel to and separated from the first plane 69A.

The interconnect 40 connected to the energy storage device 20 and circuitry 80 extends from the second plane 69B adjacent the ground plane 54 of the antenna 50, over the fold 70, to the circuitry 80 in the first plane 69A.

In this example, the interconnect 40 forms a loop, that surrounds on three sides the loop formed by the first antenna element 63, the circuitry 80 and the second antenna element 64.

Where the energy storage device 20 is one or more proton battery cell 24, for example as illustrated in any of FIGS. 2 to 4, the second electrodes 28 may be provided by the interconnect 40 that extends from adjacent the ground plane 54, over the fold 70, to the circuitry 80.

In some, but not necessarily all examples, the gap 53 formed between the folded substrate 68 may be an air gap.

In some, but not necessarily all examples, the gap 53 formed between the folded substrate 68 may be filled fully or partially with a dielectric material. The dielectric material may be configured to keep the first plane 69A and the second plane 69B at a constant separation and provide a supporting function. The dielectric material may be solid or semi-solid. The dielectric material may have a low loss tangent (tan δ).

Figure 7A:
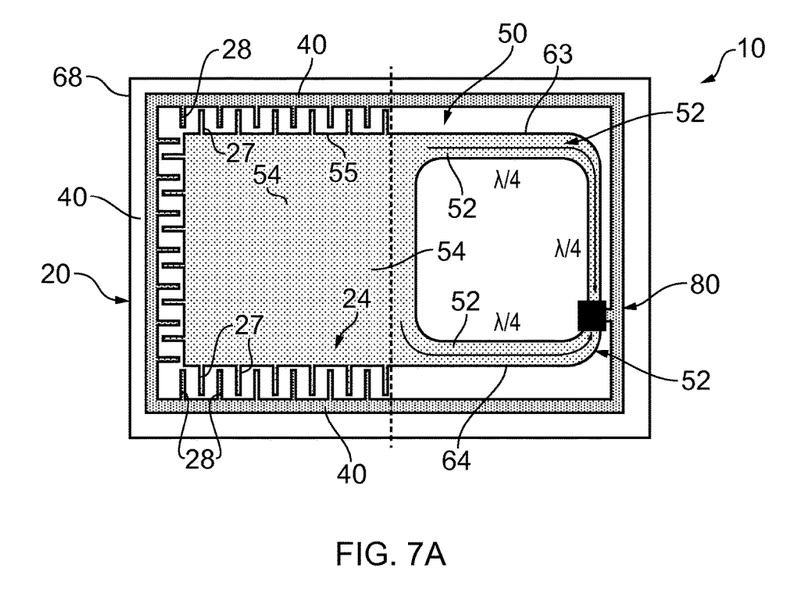
FIG. 7A illustrates an example of the apparatus of FIG. 6A where the energy storage device comprises one or more proton battery cell and FIG. 7B illustrates the apparatus of FIG. 7A when folded.
Figure 7B:
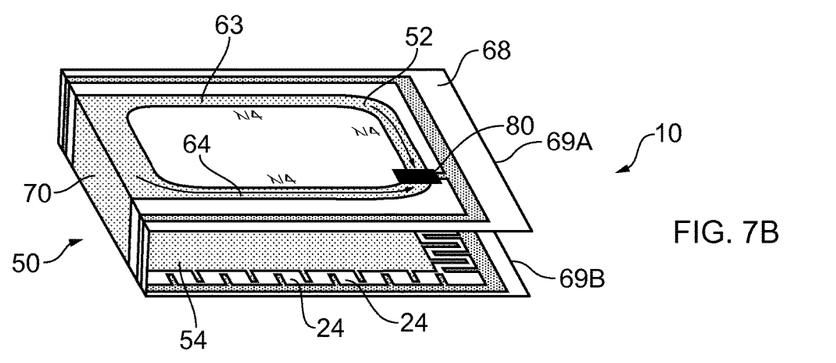

FIG. 7A illustrates an example similar to that illustrated in FIG. 6A, where the energy storage device 20 is one or more proton battery cell 24 as previously described with reference to FIG. 3. FIG. 7B illustrates a folded version of the apparatus 10 illustrated in FIG. 7A. In these examples, the first electrodes 27 and second electrodes 28 are interdigitated and the first electrodes extend from the perimeter 55 of only the ground plane 54 of the antenna 50.

Figure 8A:
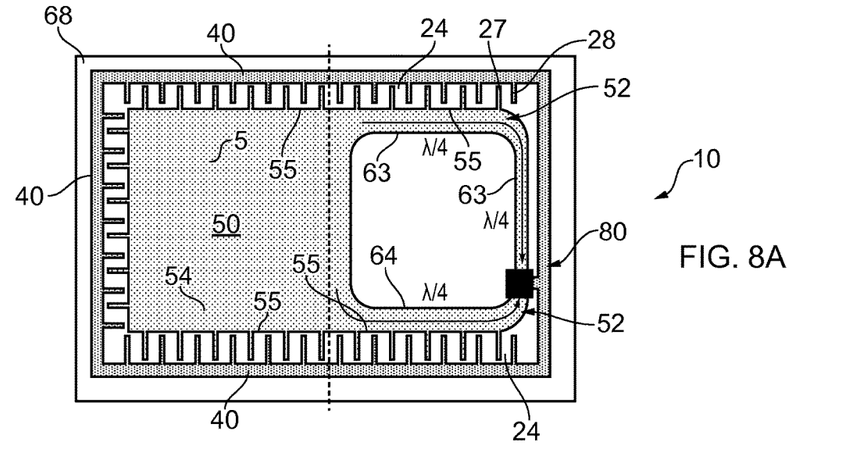
FIG. 8A illustrates another example of the apparatus of FIG. 6A where the energy storage device comprises one or more proton battery cell and FIG. 8B illustrates the apparatus of FIG. 8A when folded.
Figure 8B:
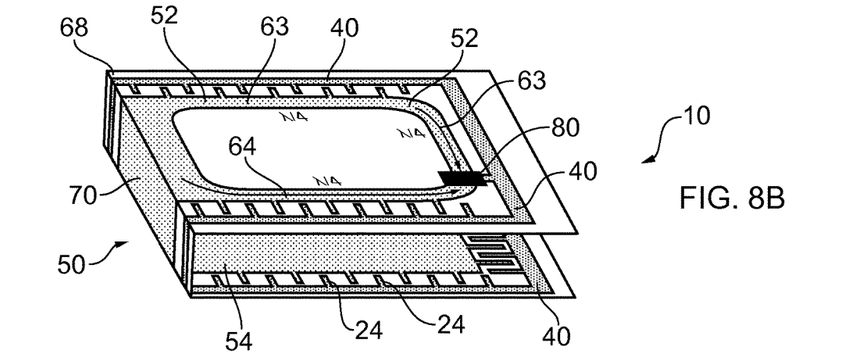

FIG. 8A illustrates an example similar to that illustrated in FIG. 7A, where the energy storage device 20 is one or more proton battery cell 24 as previously described with reference to FIG. 3. However, in this example, the first electrodes 27 and second electrodes 28 are interdigitated and the first electrodes extend from the perimeter 55 of the ground plane 54 of the antenna 50 and also from an external perimeter 55 of the antenna element 52. FIG. 8B illustrates a folded version of the apparatus 10 illustrated in FIG. 8A.

Figure 9A:
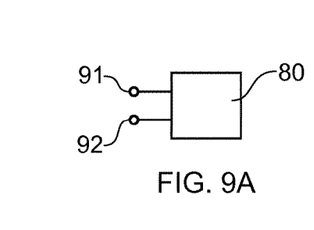
FIGS. 9A, 9B and 9C illustrate examples of the circuitry of the apparatus.

FIG. 9A illustrates an example of circuitry 80 comprising interconnection terminals 91, 92. The interconnection terminals are configured to enable connection of additional circuitry, for example sensor circuitry, to the circuitry 80.

Figure 10A:
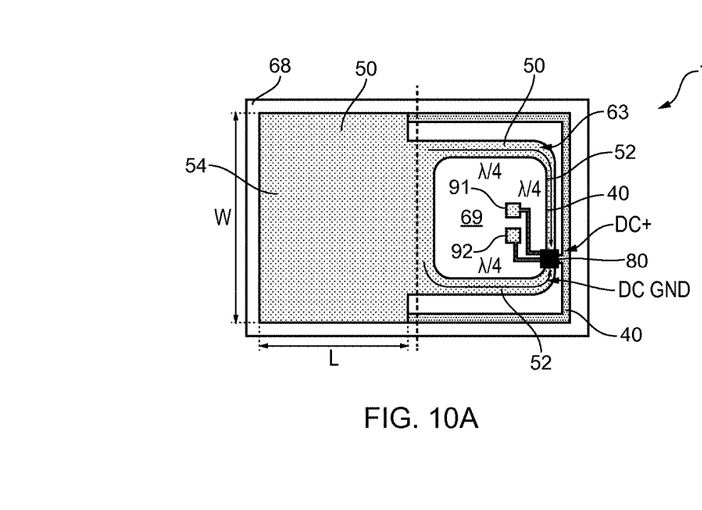
FIGS. 10A and 10B illustrate the addition of additional circuitry using an adhesive label.
Figure 10B:
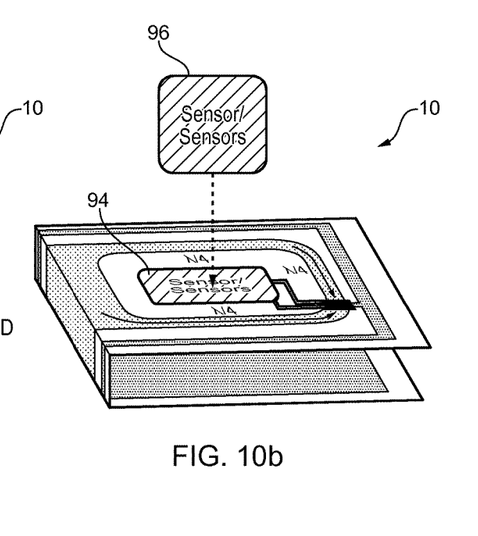

FIG. 10A illustrates an apparatus 10 similar to those illustrated in FIG. 6A, 7A, 8A. The interconnection terminals 91, 92 are located in the central region 69. FIG. 10B illustrates an apparatus 10 of FIG. 10A after it has been folded and after additional circuitry 94 has been attached to the interconnection terminals 91, 92. In this example, the additional circuitry 94 is attached using an adhesive label 96. In this example, the additional circuitry 94 comprises one or more sensors.

Figure 9B:
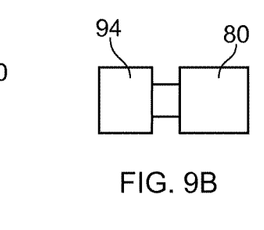

FIG. 9B illustrates an example of circuitry 80 connected to additional circuitry 94, for example sensor circuitry.

Figure 9C:
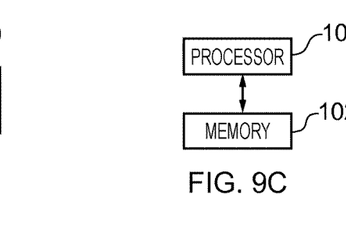

FIG. 9C illustrates an example of circuitry 80. In this example, but not necessarily all examples, the circuitry 80 comprises a processor 100 and memory 102. The memory 102 may be non-volatile memory. The circuitry 80 may have a sensing mode in which the apparatus 10 senses at least one parameter and the processor 100 stores the sensed parameter in the non-volatile memory 102 for future communication to a reader.

In the preceding examples, the circuitry 80 may be provided as a radio-frequency identification (RFID) chip or controller that communicates using the antenna 50 with a separate reader. Alternatively or in addition, the circuitry 80 may use a different RF or Wireless Communication system other than RFID. For example, the circuitry may comprise a cellular or non-cellular communication system including any relevant RF & baseband (BB) circuitry.

The apparatus 10 may be configured as a tag comprising a portable energy storage and antenna device or as a tag comprising a portable energy storage, sensor and antenna device.

The methods of FIGS. 11 and 12 illustrate methods in which at least a part of an antenna 50, comprising an antenna element 52 and a ground plane 54 is formed simultaneously with at least a part of the energy storage device 20, such that the ground plane 54 of the antenna 50 is formed as an electrode of the energy storage device 20.

Figure 11A:
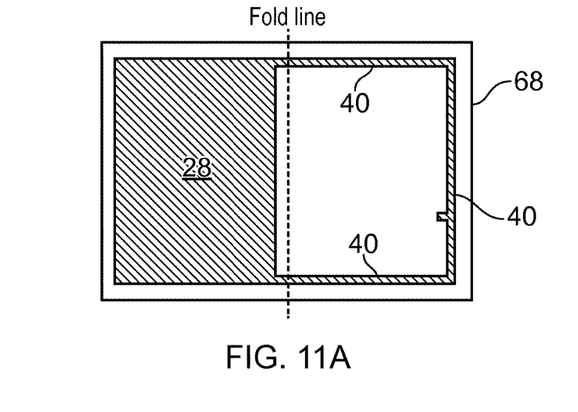
FIGS. 11A to 11E illustrate a method of manufacturing the apparatus.
Figure 11B:
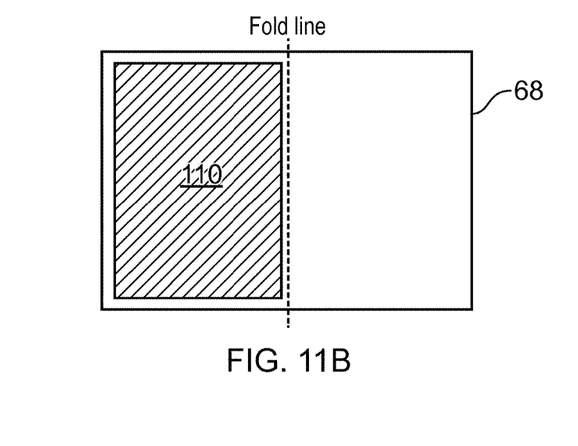
Figure 11C:
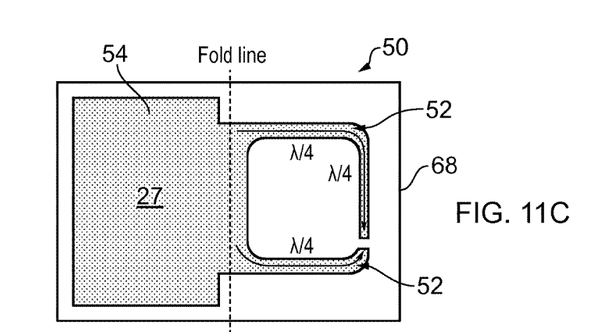

FIGS. 11A, 11B and 11C (which may alternatively be performed in reverse order), comprise:

FIG. 11A illustrates forming, on the substrate 68, second electrode(s) 28 of the energy storage device 20 and the interconnect 40.

In some but not necessarily all embodiments, the second electrode(s) 28 and the interconnect 40 may be formed simultaneously by printing.

FIG. 11B illustrates forming active layers 110. The active layers 110 form the energy storage device 20 between the first electrode(s) 27 and the second electrode(s) 28 of the energy storage device 20.

In some but not necessarily all embodiments, the active layers 110 may be formed by printing.

FIG. 11C illustrates forming on the substrate 68 the antenna 50. The antenna, in this example, comprises a ground plane 54 and an antenna element 52 as previously described with reference to FIGS. 6A, 7A and 8A. The ground plane 54 of the antenna 50 is formed as the first electrode(s) 27 of the energy storage device 20.

In some but not necessarily all embodiments, the first electrode(s) 27 and the antenna 50 may be formed simultaneously by printing.

It will be recalled, that in the examples of FIGS. 7A and 8A, that the ground plane 54 is configured to provide, in electrical parallel, at least some first electrodes 27 of one or more proton battery cell 24 and that the interconnect 40 is configured to provide the second electrodes 28 of the one or more proton battery cell 24.

The one or more proton battery cell 24 may be formed by: forming proton conductor regions 25 adjacent and forming electron conductor regions 26 adjacent respective ones of the first electrodes 27 and the second electrodes 28. In some but not necessarily all examples, a membrane or junction may be formed between the proton conductor regions 25 and the electron conductor regions 26.

In some but not necessarily all embodiments, the proton conductor regions 25 and/or the electron conductor regions 26 may be formed by printing.

Figure 11D:
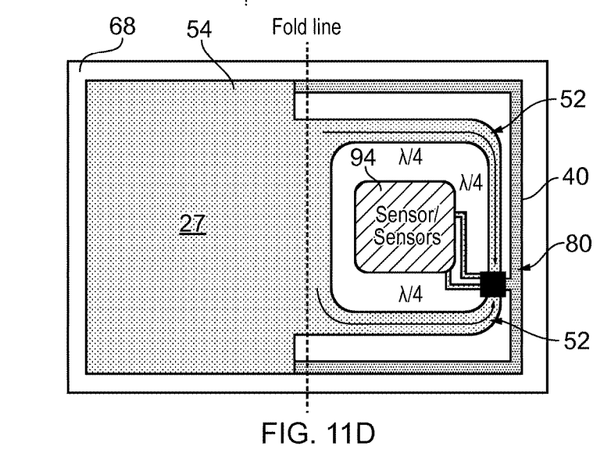

Then circuitry 80 and any additional circuitry 94 is formed and the resultant apparatus 10 is illustrated in FIG. 11D. This apparatus 10 is similar to those described with reference to FIGS. 7A, 8A, 9A, 10A.

The circuitry 80 is configured to be powered via the first and second electrode(s) of the energy storage device 20 and is configured to be operably connected to the antenna 50, a portion of which is formed from the first electrode 27 of the energy storage device 20.

Figure 11E:
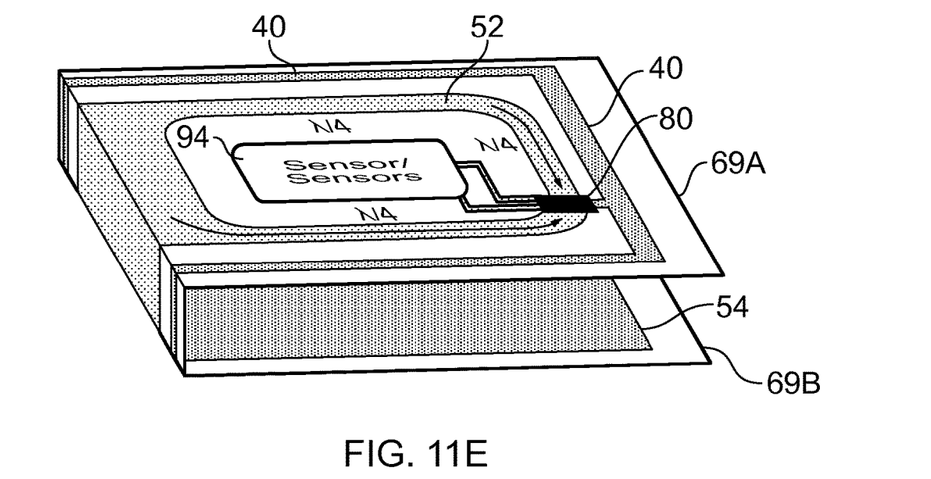

Then the apparatus 10 is folded to form the apparatus 10 illustrated in FIG. 11E. This apparatus 10 is similar to those described with reference to FIGS. 7B, 8B, 9B, 10B. A first portion of the folded substrate 68 in a first plane 69A supports the antenna element 52 of the antenna 50 and the circuitry 80 (and additional circuitry 94, if present). A second portion of the folded substrate 68 in a second plane 69B supports the ground plane 52 of the antenna 50, at least some of the first electrodes 27 and at least some of the second electrodes 28.

Figure 12A:
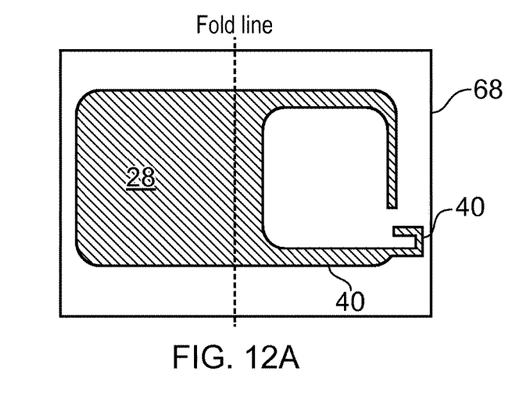
FIGS. 12A to 12D illustrate a different method of manufacturing the apparatus.
Figure 12B:
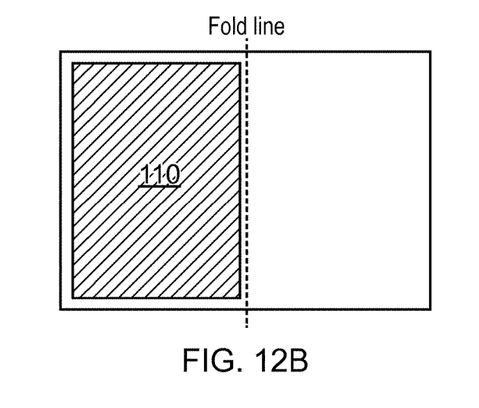
Figure 12C:
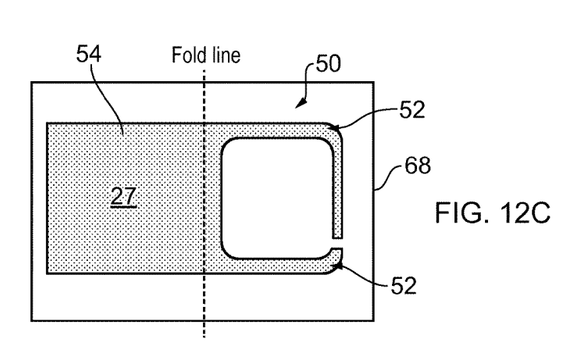
Figure 12D:
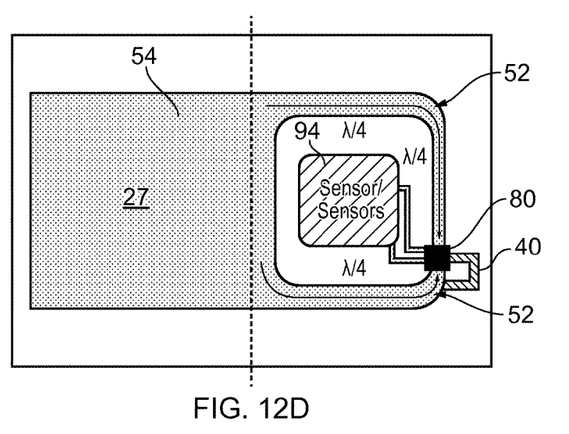

FIGS. 12A to 12D are similar to FIGS. 11A to 11D. They differ in that the shape of the interconnect 40 in FIG. 12A is different to that in FIG. 11A.

In FIG. 11A, the interconnect 40 forms a closed loop. In FIG. 12A, the interconnect 40 forms an arm.

Implementation of the circuitry 80 may be as a controller. Such a controller may be implemented in hardware alone, have certain aspects in software including firmware alone or can be a combination of hardware and software (including firmware).

The controller may be implemented using instructions that enable hardware functionality, for example, by using executable computer program instructions in a general-purpose or special-purpose processor 100 that may be stored on a computer readable storage medium (disk, memory etc) to be executed by such a processor 100.

The processor 100 is configured to read from and write to the memory 102. The processor 100 may also comprise an output interface via which data and/or commands are output by the processor 100 and an input interface via which data and/or commands are input to the processor 100.

The memory 102 may store a computer program comprising computer program instructions (computer program code) that controls the operation of the apparatus 10 when loaded into the processor 100. The processor 100 by reading the memory 102 is able to load and execute the computer program.

The computer program may arrive at the apparatus 10 via any suitable delivery mechanism. The delivery mechanism may be, for example, a non-transitory computer-readable storage medium, a computer program product, a memory device, a record medium, an article of manufacture that tangibly embodies the computer program. The delivery mechanism may be a signal configured to reliably transfer the computer program. The apparatus 10 may propagate or transmit the computer program as a computer data signal.

Although the memory 102 is illustrated as a single component/circuitry it may be implemented as one or more separate components/circuitry some or all of which may be integrated/removable and/or may provide permanent/semi-permanent/dynamic/cached storage.

Although the processor 100 is illustrated as a single component/circuitry it may be implemented as one or more separate components/circuitry some or all of which may be integrated/removable. The processor 100 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc, should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Where a structural feature has been described, it may be replaced by means for performing one or more of the functions of the structural feature whether that function or those functions are explicitly or implicitly described.

The antenna 50 performs the function of wireless radio communication and may be replaced by any suitable antenna means.

The energy storage device 20 performs the function of energy storage and may be replaced by any suitable antenna means.

The circuitry 80 performs a function using the antenna for communication and the energy of the energy storage device 20. It may be replaced by any suitable antenna control means.

An operational resonant frequency $f_R$ of the antenna 50 is a frequency that lies within an 'operational bandwidth'. Operational bandwidth is a frequency range over which the antenna 50 can efficiently operate. Efficient operation occurs, for example, when the antenna's insertion loss S11 is greater than an operational threshold such as 4 dB or 6 dB. The operational resonant frequency $f_R$ may be the frequency at which S11 has a turning point.

As used here 'module' refers to a unit or apparatus that excludes certain parts/components that would be added by an end manufacturer or a user. The apparatus 10 may be a module. The apparatus 10 may be provided in a folded or unfolded state, or a foldable state. The apparatus 10 may be provided with or without circuitry 80. The apparatus 10 may be provided with or without additional circuitry 94.

In some, but not necessarily all embodiments, the apparatus 10 is provided to a user in a folded state.

In other, but not necessarily all embodiments, the apparatus 10 is provided to a user in a foldable state. The user can then re-configure the apparatus 10 between the folded state and the unfolded state. The folded state may, for example, correspond to an operational state of the circuitry 80 and the unfolded state may correspond to a non-operational state of the circuitry 80.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Each battery cell 24 comprises: a proton conductor region 25 configured to conduct proton charge carriers; a electron conductor region 26 configured to conduct electrons; a first electrode 27 associated with one of the proton conductor region 25 and the electron conductor region 26; and a second electrode 28 associated with the other of the proton conductor region 25 and the electron conductor region 26.

The charge transfer mechanism between the proton conductor region 25 and the electron conductor region 26 may be such that protons are transferred from the proton conductor region 25 to the electron conductor region 26, such that electrons are transferred from the electron conductor region 26 to the proton conductor region 25; protons are transferred from the proton conductor region 25 to the electron conductor region 26 and electrons are transferred from the electron conductor region 26 to the proton conductor region 25;

The one or more proton conductor regions 25 may, for example be proton-generator regions, configured to donate proton charge carriers and the one or more electron-conductor regions may be proton-acceptor regions, configured to accept donated proton charge carriers.

The one or more proton conductor regions 25 may, for example be electron-acceptor regions, configured to accept transferred electron charge carriers and the one or more electron-conductor regions may be electron-generator regions, configured to donate electron charge carriers.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising
one or more cells, each cell comprising:
   a proton conductor region;
   an electron conductor region;
   a first electrode associated with one of the proton conductor region and the electron conductor region; and
   a second electrode associated with the other of the proton conductor region and the electron conductor region;
   an antenna, wherein at least a portion of the antenna is configured to provide, in electrical parallel, the first electrode or at least some of the first electrodes of the one or more cells; and
   circuitry configured to be powered via the second electrode or the second electrodes of the one or more cells, wherein the circuitry is configured to operably connect to the antenna.

2. An apparatus as claimed in claim 1, wherein the one or more cells are two-dimensional.

3. An apparatus as claimed in claim 1, wherein the first electrode or the first electrodes and the second electrode or the second electrodes are interdigitated.

4. An apparatus as claimed in claim 1, wherein the first electrode or the first electrodes extend outwardly from the antenna towards a perimeter interconnect and are separated from the perimeter interconnect by first gaps and the second electrode or the second electrodes extend inwardly from the perimeter interconnect towards the antenna and are separated from the antenna by second gaps.

5. An apparatus as claimed in claim 1, wherein the first and second electrodes of each cell are physically parallel and/or the first and second electrodes of each cell are straight and separated by a separation gap.

6. An apparatus as claimed in claim 1, wherein the proton conductor region comprises a graphene derivative, comprises graphene oxide, or comprises charge-generating functional groups comprising one or more of carboxyl, hydroxyl, and epoxy.

7. An apparatus as claimed in claim 1, wherein the proton conductor region is configured to generate and conduct protons in the presence of water.

8. An apparatus as claimed in claim 1, wherein the electron conductor region comprises at least one of: a graphene derivative different to the proton conductor region, reduced graphene oxide and conjugated polymer.

9. An apparatus as claimed in claim 1, wherein the proton conductor region has an acidic potential of Hydrogen pH and the electron conductor region has an alkali pH.

10. An apparatus as claimed in claim 1, wherein the proton conductor region is separated from the electron conductor region by a synthetic ionomer membrane.

11. An apparatus as claimed in claim 1, wherein the antenna comprises an antenna element and a ground plane.

12. An apparatus as claimed in claim 11, wherein at least the ground plane comprises extensions providing the first electrode or at least some of the first electrodes of the one or more cells.

13. An apparatus as claimed in claim 11, wherein the antenna element lies in a plane and comprises an in-plane feed terminal and an in-plane ground terminal.

14. An apparatus as claimed in claim 1, wherein the apparatus is a portable energy storage and antenna device.

15. A method comprising
   forming on a substrate an antenna, wherein at least a portion of the antenna is configured to provide, in electrical parallel, a first electrode or at least first electrodes of one or more cells;
   forming on the substrate a second electrode or second electrodes of the one or more cells, in electrical parallel;
   providing circuitry configured to be powered via the second electrode or the second electrodes of the one or more cells, wherein the circuitry is configured to be operably connected to the antenna; and forming the one or more cells, by:
  forming one or more proton conductor region, associated with the first electrode or the first electrodes;
  forming one or more electron conductor region, associated with the second electrode or the second electrodes.

16. A method as claimed in claim 15, comprising: printing one or more of the antenna, the second electrode or the second electrodes, the proton conductor region and the electron conductor regions.

17. A method as claimed in claim 15, comprising: folding the substrate such that a first portion of the substrate in a first plane supports a ground plane of the antenna, the first electrode or at least some of the first electrodes and the second electrode or at least some of the second electrodes and such that a second portion of the substrate in a second plane supports an element of the antenna and the circuitry.

18. An apparatus comprising:
  an antenna comprising an antenna element and a ground plane; and
  an energy storage device having a first electrode and a second electrode;
  wherein the ground plane is in electrical parallel with the energy storage device and provides the first electrode or the second electrode of the energy storage device.

19. An apparatus as claimed in claim 18, wherein the ground plane provides an electrode within the energy storage device.

20. An apparatus as claimed in claim 18, wherein the antenna element lies in a plane and comprises an in-plane feed terminal and an in-plane ground terminal.

* * * * *